United States Patent
D'Angelo et al.

(10) Patent No.: US 9,212,967 B2
(45) Date of Patent: Dec. 15, 2015

(54) METHOD FOR MONITORING THE QUALITY OF INDUSTRIAL PROCESSES AND SYSTEM THEREFROM

(71) Applicant: c/o C.R.F. SOCIETÀ CONSORTILE PER AZIONI, Orbassano (Torino) (IT)

(72) Inventors: Giuseppe D'Angelo, Orbassano (IT); Giorgio Pasquettaz, Orbassano (IT)

(73) Assignee: C.R.F. SOCIETÀ CONSORTILE PER AZIONI, Orbassano (Torino) (IT)

( * ) Notice: Subject to any disclaimer, the term of this patent is extended or adjusted under 35 U.S.C. 154(b) by 364 days.

(21) Appl. No.: 13/709,703

(22) Filed: Dec. 10, 2012

(65) Prior Publication Data

US 2013/0199296 A1 Aug. 8, 2013

(30) Foreign Application Priority Data

Feb. 6, 2012 (EP) .................................. 12154007

(51) Int. Cl.
  *G01M 7/00* (2006.01)
  *B23K 26/03* (2006.01)
  (Continued)

(52) U.S. Cl.
  CPC ............... *G01M 7/00* (2013.01); *B23K 26/032* (2013.01); *B23K 26/0853* (2013.01);
  (Continued)

(58) Field of Classification Search
  CPC ........................................................ G01M 7/00
  USPC ........................ 73/622, 865.8, 588; 219/121.61–121.72, 121.82–121.85; 702/40, 81–84, 182, 188, 108–111; 700/32–34, 108–111, 166; 250/205; 340/3.1, 3.3, 3.42, 3.43, 3.44; 706/900, 706/904
  See application file for complete search history.

(56) References Cited

U.S. PATENT DOCUMENTS 5,983,162 A * 11/1999 Huang ............................. 702/4
6,674,044 B2 * 1/2004 Bolognese et al. ...... 219/121.73
(Continued)

FOREIGN PATENT DOCUMENTS

CN 100451895 C 1/2009
CN 100464270 C 2/2009
(Continued)

OTHER PUBLICATIONS

X. Lu et al., "Guided Wave Propagation Based Damage Detection in Welded Rectangular Tubular Structures", Second International Conference on Smart Materials and Nanotechnology in Engineering, Jul. 8, 2009, vol. 7493.
(Continued)

*Primary Examiner* — Helen Kwok
(74) *Attorney, Agent, or Firm* — Nixon & Vanderhye P.C.

(57) ABSTRACT

A method for monitoring the quality of an industrial working process, which includes identifying defects of the working process, comprises acquiring at least one signal having multiple frequency components from the industrial working process, decomposing the at least one signal having multiple frequency components in signals having single frequency components, calculating the information content for each signal having a single frequency component, analyzing the information content for each signal having a single frequency component, and if the value of the information content of the signal at the lowest single frequency component does not represent a main percentage of the information content of the whole acquired signal, the acquired signal having multiple frequency components is evaluated as indicative of a working process with defects and a defect analysis step is performed on the signal having multiple frequency components.

15 Claims, 6 Drawing Sheets

(51) Int. Cl.
*B23K 31/12* (2006.01)
*G05B 19/418* (2006.01)
*B23K 26/08* (2014.01)
*B23K 26/26* (2014.01)
*B23K 26/32* (2014.01)
*B29C 65/16* (2006.01)
*B29C 65/00* (2006.01)

(52) U.S. Cl.
CPC ............... *B23K 26/26* (2013.01); *B23K 26/32* (2013.01); *B23K 26/3246* (2013.01); *B23K 31/125* (2013.01); *B29C 65/1616* (2013.01); *B29C 65/1658* (2013.01); *B29C 65/1674* (2013.01); *B29C 66/1142* (2013.01); *B29C 66/43* (2013.01); *B29C 66/836* (2013.01); *B29C 66/91216* (2013.01); *B29C 66/91221* (2013.01); *B29C 66/91951* (2013.01); *B29C 66/9221* (2013.01); *B29C 66/9241* (2013.01); *B29C 66/939* (2013.01); *B29C 66/93431* (2013.01); *B29C 66/961* (2013.01); *G05B 19/41875* (2013.01); *B29C 66/71* (2013.01); *B29C 66/8242* (2013.01); *B29C 66/91411* (2013.01); *G05B 2219/37217* (2013.01); *G05B 2219/45138* (2013.01)

(56) References Cited

U.S. PATENT DOCUMENTS

| | | | |
|---|---|---|---|
| 7,702,476 B2 * | 4/2010 | D'Angelo et al. | 702/84 |
| 7,728,254 B2 * | 6/2010 | D'Angelo et al. | 219/121.62 |
| 2011/0023610 A1 | 2/2011 | Ume et al. | |

FOREIGN PATENT DOCUMENTS

| | | |
|---|---|---|
| EP | 1 555 082 | 7/2005 |
| EP | 1 610 195 | 12/2005 |
| JP | A-2005-216294 | 8/2005 |
| WO | WO 2011/026638 | 3/2011 |
| WO | WO 2011/026638 A1 | 3/2011 |

OTHER PUBLICATIONS

C. Bao et al., "Time-varying System Identification Using a Newly Improved HHT Algorithm", Computers and Structures, Dec. 1, 2009, vol. 87, No. 23-24, pp. 1611-1623.
European Search Report for EP 12154007 dated Jul. 2, 2012.
Office Action issued Dec. 9, 2014 in corresponding Chinese Patent Application No. 201210510711.4 (with translation).

* cited by examiner

Fig. 6

METHOD FOR MONITORING THE QUALITY OF INDUSTRIAL PROCESSES AND SYSTEM THEREFROM

This application claims priority to EP 12154007.4 filed 6 Feb. 2012, the entire contents of which is hereby incorporated by reference.

FIELD OF THE INVENTION

The present invention relates to methods for monitoring the quality of an industrial working process, which includes identifying defects of the working process, of the type comprising the steps of:

acquiring a signal having multiple frequency components from the industrial working process, evaluating said signal having multiple frequency components acquired from the industrial working process to indicate if said defects and a defect analysis step is performed on said signal having multiple frequency components, said evaluation being performed without comparing said signal having multiple frequency components acquired from the industrial working process to a stored reference signal.

Monitoring defects in industrial processes is assuming a growing economic importance due to its impact in the analysis of the quality of industrial products. The ability to obtain an assessment of the quality of the industrial process on line and automatically has many advantages, both in economic terms and in terms of process velocity. Therefore, the desirable characteristics of the system are:

on line processing;

ability to recognize the main production defects with accuracy.

Currently, the problem of recognizing the quality of an industrial process, and thus of identifying any defects, takes place through an off-line inspection conducted by experts, or with automatic methods which, through sensors, identify only some of the aforementioned defects, in a manner that is not satisfactory and that is also sensitive to the different settings of the machine.

Methods and systems for monitoring the quality of industrial processes are known, for instance applied to the on-line monitoring of the laser welding process, in particular in the case of metal plate welding. The monitoring system is able to assess the presence of porosities in the welded area or, in the case of butt-welded thin metal plates, the presence of defects due to the superposition or to the disjunction of the metal plates.

Such systems in use base quality monitoring on a comparison between the signals obtained during the process and one or more predetermined reference signals, indicative of a high quality weld. Such reference signals, usually in a variable number between two and ten, are predetermined starting from multiple samples of high quality welds. This manner of proceeding implies the presence of an experienced operator able to certify the quality of the weld at the moment of the creation of the reference signals, entails time wastage and at times also material wastage (which is used to obtain the samples needed to obtain the reference signals). It would therefore be necessary, given a similar procedure, onerous in itself in terms of time and cost, for the subsequent procedure of comparison with the reference signal to be able to operate rapidly, in real time and at low cost, which does not take place in currently known systems.

SUMMARY OF THE INVENTION

The object of the present invention is to overcome all the aforesaid drawbacks.

In view of achieving said object, the invention relates to a method for monitoring the quality of industrial processes having the characteristics set out in the foregoing and further characterized by the fact that it further comprises the operations of:

decomposing said at least one signal having multiple frequency components in signals having single frequency components, calculating the information content for each signal having a single frequency component, analyzing the information content for each signal having a single frequency component, and if the value of the information content of the signal at the lowest single frequency component does not represent a main percentage of the information content of the whole acquired signal, said acquired signal having multiple frequency components is evaluated as indicative of a working process with defects and a defect analysis step is performed on said signal having multiple frequency components.

In the preferred embodiment, said informative content is evaluated by calculating the variance of signals having single frequency components. The method is applied preferably to laser working process acquiring as signal acquired from the process radiation emitted by the process.

Naturally, the invention also relates to the system for monitoring the quality of industrial processes which implements the method described above, as well as the corresponding computer product directly loadable into the memory of a digital computer such as a processor and comprising software code portions to perform the method according to the invention when the product is run on a computer.

BRIEF DESCRIPTION OF THE DRAWINGS

Additional characteristics and advantages of the present invention shall become readily apparent from the description that follows with reference to the accompanying drawings, provided purely by way of explanatory and non limiting example, in which.

DETAILED DESCRIPTION OF THE INVENTION

In order to better understand the method according to the invention, some mathematical concepts are here first briefly introduced.

The present method is aimed to apply such mathematical instruments to methods for monitoring the quality of an industrial working process, which includes identifying defects of the working process to defect analysis of signals acquired by working processes. A more complete description of such mathematical concepts can be found in the publications:

N. E. Huang, Z. Shen and S. R. Long, et al., "*The empirical mode decomposition and the Hilbert spectrum for nonlinear and non-stationary time Series Analysis*". Proc. Royal Society, vol. 454, pp. 903-995, London, 1998, and Tian-li Huang, Wei-xinRen and Meng-lin Lou, "*The orthogonal Hilbert-Huang Transform and its application in earthquake motion recordings analysis*". The 14th World Conference on Earthquake Engineering Oct. 12-17, 2008, Beijing, China.

With respect to the context of the invention, the Hilbert-Huang transform is chosen starting from the consideration that the signal acquired from the process, x(t), is usually a multicomponent non-stationary signal, i.e, a signal whose frequency changes over time. For these signals, the instantaneous frequency, $\omega$, is an important characteristic: it is a time-varying parameter which defines the location of the signal's spectral peak as it varies with time. The latter may be roughly regarded as a sine wave whose frequency sweeps with time. On the contrary, a stationary signal is one whose where frequencies do not change over time.

In most cases, the signal acquired from the working process x(t) cannot be analysed by the Fourier transform, because any non-linear distorted waveform can be regarded as harmonic distortions, which are a mathematic artificial consequence of imposing a linear structure on a non-linear system. They may have mathematical meanings but not physical. Therefore, it is chosen here to describe a non-linear system by way of the instantaneous frequency.

The Hilbert transform is the easiest way to compute instantaneous frequency, through which a complex conjugate y(t) of any real value function can be determined by:

$$y(t) = H[x(t)] = \frac{1}{\pi} PV \int_{-\infty}^{\infty} \frac{x(\tau)}{t-\tau} d\tau$$

PV indicates the principal value of singular integral. In other words, the Hilbert transform consists of passing the signal acquired from the working process x(t) through a system which leaves the magnitude unchanged, but changes the phase of all frequency components by $\pi/2$.

The analytic signal z(t) is defined as:

$$z(t) = x(t) + Iy(t) = a(t)e^{-i\theta(t)}$$

where $$\begin{bmatrix} \alpha(t) = \sqrt{x^2 + y^2} & \text{istantaneous amplitude} \\ \theta(t) = \arctan(y/x) & \text{phase function} \\ \omega = d\theta/dt & \text{instantaneous frequency} \end{bmatrix}$$

Using the Hilbert transform directly would cause a problem, and the instantaneous frequency could not be correctly evaluated. In fact, the Hilbert transform works well if applied to narrow band-passed signal.

Unfortunately, most signals are not band limited.

In N. E. Huang, Z. Shen and S. R. Long, et al., "*The empirical mode decomposition and the Hilbert spectrum for nonlinear and non-stationary time Series Analysis*". Proc. Royal Society, vol. 454, pp. 903-995, London, 1998, it is shown a method, called a sifting process, that decomposes a wide class of signals into a set of band-limited functions (Intrinsic Mode Functions, IMFs). By the proposed decomposition, it is possible to extract instantaneous information from the signal.

For what regards specifically the EMD (Empirical Mode Decomposition), such decomposition includes the assumption that any data consists of different simple intrinsic models of oscillations. Each intrinsic mode, no matter if linear or not, represents an oscillation, which will have the same number of extrema and zero-crossings, and then the oscillation will be symmetric with respect to the local mean. Usually, the data may have many different oscillations which can be represented by the intrinsic mode functions (IMF) with the following definition:

in the whole dataset, the number of extrema and the number of zero-crossings must either equal or differ at most by one, and at any point, the mean value of the envelope defined by the local maxima and the envelope defined by the local minima is zero.

An intrinsic mode function IMF is much more general than an oscillation mode because it has a variable amplitude and frequency as a function of time.

According to the definition for the intrinsic mode function IMF, any function can be decomposed by the following operations:

first, find all the local maxima extrema of the signal x(t), interpolate (preferably by a cubic spline fitting) between all the maxima extrema ending up with some upper envelope $e_{max}(t)$ find all the local minima extrema;

interpolate (cubic spline fitting) between all the minima extrema ending up with some lower envelope $e_{min}(t)$;

compute a mean envelope $m_1$ between upper envelope $e_{max}(t)$ and lower envelope $e_{min}(t)$:

$$m_1 = [e_{min}(t) + e_{max}(t)]/2$$

compute a residue $h_1$:

$$h_1 = x(t) - m_1$$

then a critical decision must be made by evaluating a stoppage criterion. Given:

$$SD_k = \Sigma_{t=0}^{T}[|(h_{1(k-1)}(t) - h_{1k}(t))|^2 / h_{1(k-1)}^2(t)]$$

if this squared difference $SD_k$ is smaller than a predetermined threshold, the sifting process will be stopped.

Ideally, the residue $h_1$ should satisfy the definitions of an intrinsic mode function IMF, so it should be symmetric and have all maxima positive and all minima negative. However, the hump on slope may become a local maximum after the first round of sifting, and then the residue may not satisfy the definitions of an intrinsic mode function IMF.

Such sifting process has two purposes, to eliminate riding waves, and to make the wave profiles more symmetric.

The first purpose is designed for the Hilbert transform to give a meaningful instantaneous frequency, the second purpose is designed in case the neighbouring wave amplitude have too large disparity. For these two purposes, the sifting process should be repeated until to extract the residue satisfying the definition of an intrinsic mode function IMF.

In the next step, residue $h_1$ is treated as a new data; then:

$$h_{11} = h_1 - m_{11}$$

After repeating sifting process, up to a number k k of times, residue $h_{1k}$ becomes an IMF function; that is:

$$h_{1k} = h_{1(k-1)} - m_{1k}$$

Then, it is designated as:

$$c_1 = h_{1k}$$

the first intrinsic mode function IMF from the data. Once the first IMF component $c_1$ has been found, it should contain the finest scale or the shortest period component of the signal. The rest of the data is that:

$$r_1 = x(t) - c_1$$

Since the residue $r_1$ still contains longer period variations in the data, it is treated as the new data and it is repeated the same sifting process with respect to it. The result is:

$$r_2 = r_1 - c_2$$

$$r_n = r_{n-1} - c_n$$

No matter how small the component $c_n$ or the residue $r_n$ is, or no more IMF s can be extracted, the final residue still can be different from zero.

Figure 4:
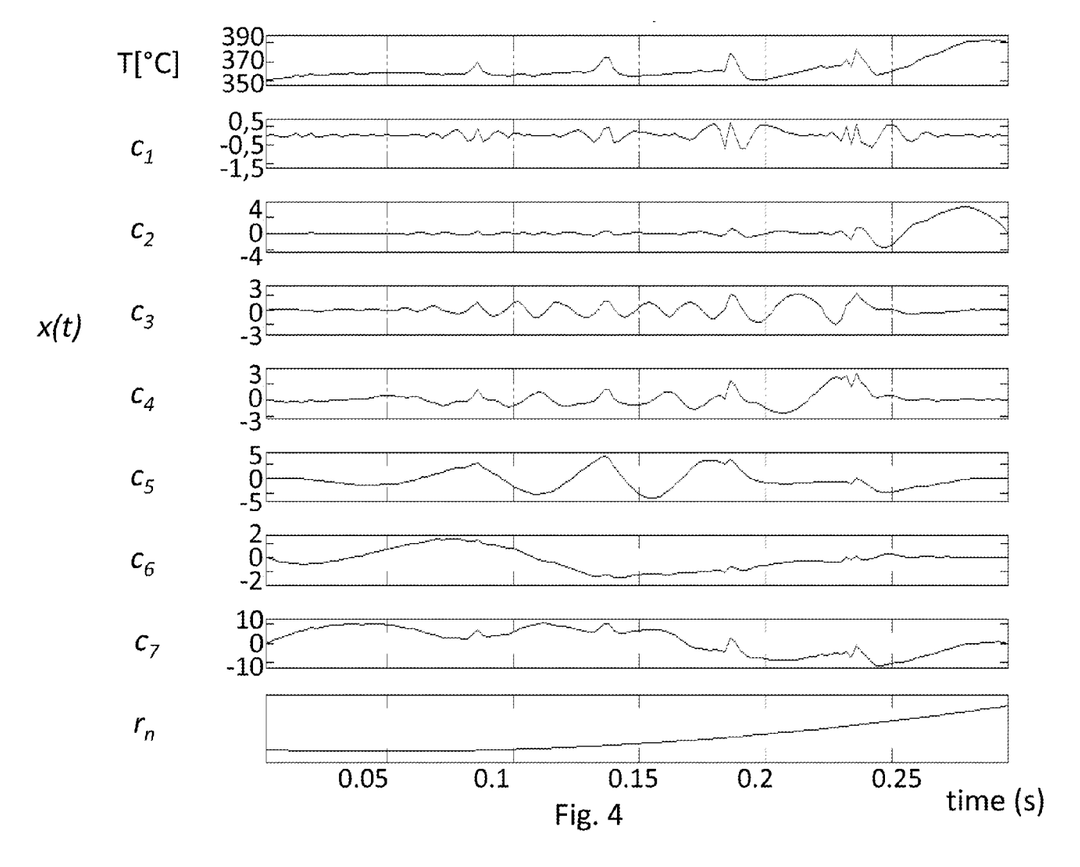
FIG. 4 shows signals processed by a step of the method according to the invention.

FIG. 4 is a diagram showing the EMD decomposition in IMF components, or more specifically the components $c_j$ and final residue of a signal acquired from the working process $x(t)$ which is a temperature signal, also shown in FIG. 4, detected during the laser welding of polymers by the system 10 described in the following with reference to FIG. 1. By summing up the previous equations it is obtained that the signal acquired from the working process $x(t)$ is a summation of components $c_j$ and residue $r_n$:

$$x(t) = \sum_{j=1}^{n} c_j + r_n$$

Thus, an n-empirical mode decomposition is achieved, and the residue $r_n$ is obtained.

The components of the EMD decomposition are usually physically meaningful, for the characteristic scales are defined by the physical data.

After the empirical mode decomposition, it is possible apply the Hilbert transform to each IMF component, and compute the instantaneous frequency.

Orthogonalization of the IMF functions can be also performed. This is made in order to ensure that the IMF functions got by EMD decomposition could re-compose original signal and that there are orthogonality among IMF components. Orthogonalization of the IMF functions is described in the above cited publication Tian-li Huang, Wei-xin Ren and Meng-lin Lou, "*The orthogonal Hilbert-Huang Transform and its application in earthquake motion recordings analysis*", The 14th World Conference on Earthquake Engineering Oct. 12-17, 2008, Beijing, China.

In order to check the orthogonality of the function IMF obtained from EMD decomposition it is known also from to define an overall index of orthogonality $IO_T$ and a partial index of orthogonality for any two components $IO_{jk}$, as follows:

$$IO_T = \sum_{j=1}^{n+1} \sum_{\substack{k=1 \\ k \neq j}}^{n+1} \int_0^T c_j(t) c_k(t) dt \Big/ \int_0^T x^2(t) dt = = \quad \text{(III.3)}$$

$$\sum_{j=1}^{n+1} \sum_{\substack{k=1 \\ k \neq j}}^{n+1} \sum_{i=1}^{N} c_{ji} c_{ki} \Big/ \sum_{i=1}^{N} x_i^2$$

$$IO_k = \int_0^T c_j(t) c_k(t) \Big/ \int_0^T c_j^2(t) dt + \int_0^T c_k^2(t) dt =$$

-continued $$\sum_{j=1}^{N} c_{ji} c_{ki} \Big/ \sum_{i=1}^{N} c_{ji}^2 + c_{ki}^2$$

If the IMF components from EMD are exactly orthogonal to each other, the value of $IO_T$ should be zeros, a total energy of decomposed signal $E_{tot}$ should be invariable and the energy leakage between any two IMF components $E_{jk}$ should be zero. Generally, because the function IMFs from EMD decomposition are not theoretically orthogonal, the value of orthogonality index is about from $10^{-2}$ to $10^{-3}$.

The method according to the invention shall now be exemplified with reference to a laser welding method. Said laser welding method, however, constitutes only a non limiting example of industrial process which can be applied to the method for monitoring the quality of industrial processes according to the invention.

Figure 1:
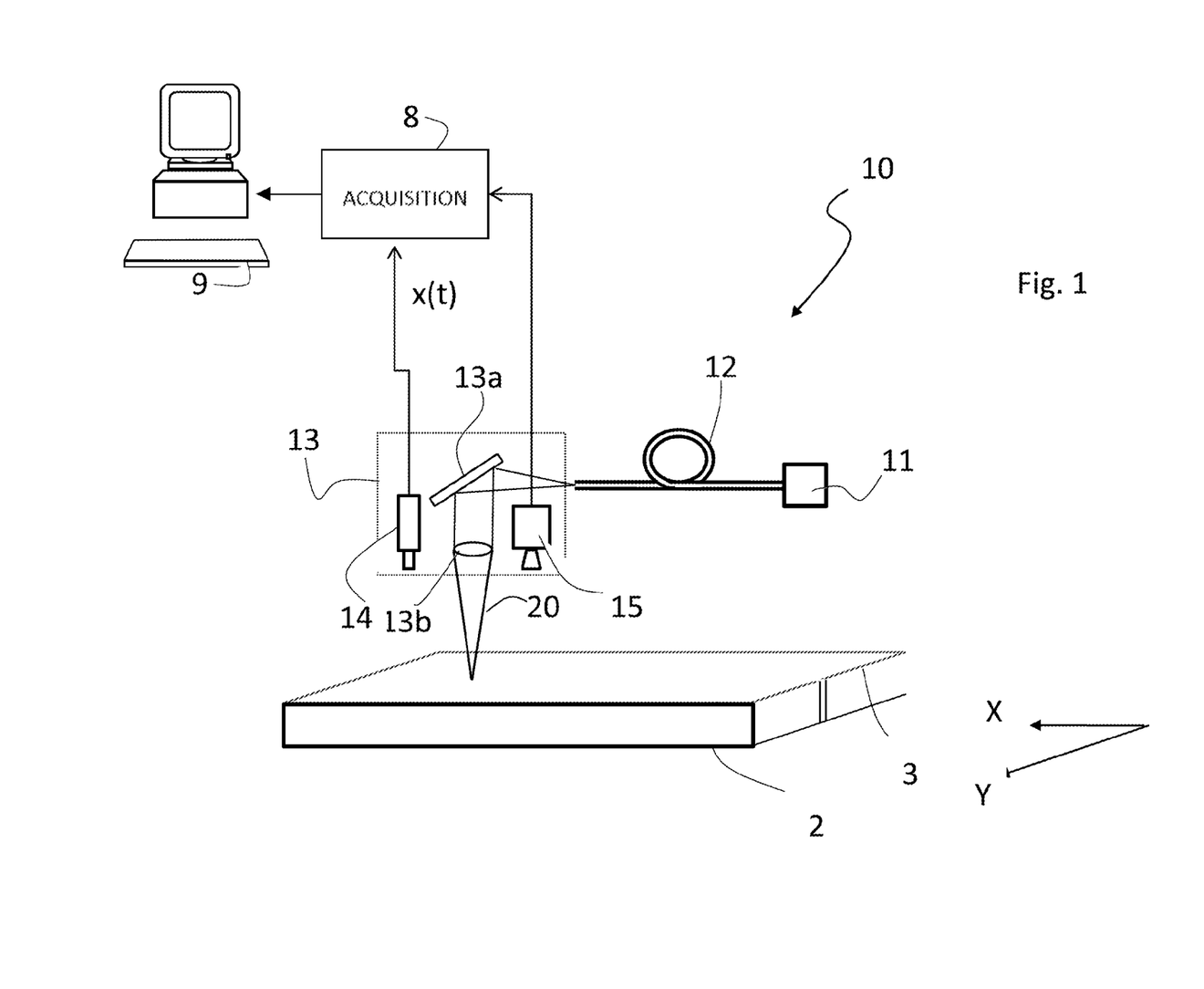
FIG. 1 is a block diagram showing a system that implements the method according to the invention.

With reference to FIG. 1, the reference number 10 designates a system for monitoring the quality of a laser welding process. The example refers to the case of two polymer work pieces 2, 3 which are welded together by means of a laser beam 20. The number 11 designates a laser source represented by a laser diode, coupled via a optic fiber 12 to a welding optic 13. In particular this is obtained by the head of a Laserline LDF400-200 fiber coupled diode laser, which laser beam 20 is guided via an Ø400 µm optical fiber 12 to the welding optic 13. The diode laser 11 is operated at 940±10 nm wavelength and the focal length used is 100 mm resulting an Ø0.6 mm focal spot on the work piece.

The welding optic 13 is schematically shown as including a mirror 13a, which can be also a beam splitter or semi-reflecting mirror beyond which sensors can be arranged to detect quantities from the welding process, such as radiation, and a focusing lens 13a whereat arrives the laser beam originated by the laser source represented by the laser diode 11.

The welding optic 13 is represented as including also a camera 15 and a pyrometer 14. The camera 15 acquires an image of the welding spot while the pyrometer 14 measures the temperature of such welding spot through the emitted radiation. The output signals of the camera 14a and a pyrometer 14b are sent to an acquisition board 8 which acquires and performs the necessary conversions on the signal and supply them to a personal computer 9 for analysis and processing.

It is here noted that the method according the invention preferably acquires a signal generated by the working process, i.e. a radiation emitted by the process as a result of the development of the working process, not a signal from the tool performing the process.

The pyrometer 14 in the exemplary embodiment of FIG. 1 is on axis in the welding optics 13. For instance a Dr Mergenthaler GmbH infrared pyrometer with Lascon controller is used. Pyrometer model is EP100P/PCI and maximum sampling rate is 10 kHz. In the experiments the used sampling rate was 5 kHz. To limit the amount of data points the data was saved at 500 Hz. The pyrometer 14 is used only for observation of weld temperature to see how defects affect the temperature.

The work pieces 2, 3 are clamped by a pneumatic clamping device (not shown) equipped with pressure control, to supply the needed pressure on the work pieces 2,3 during welding. During welding laser head 11 and welding optic 13 are kept stationary and a clamping jig with work pieces 2,3 is moved by a XY unit with constant speed on 10 mm/s.

In particular, the material used in the examples here discussed was polypropylene Sabic 579S with thickness of 1 mm.

In polymer welding, the welded parts have to be kept together during welding to be able to conduct heat from lower part to upper part.

The temperature signal acquired by the pyrometer during time is indicated in the following with x(t), and it is the signal having multiple frequency components acquired from the industrial working process, which will be discussed by way of example in the following to illustrate the method according to the invention.

Figure 2:
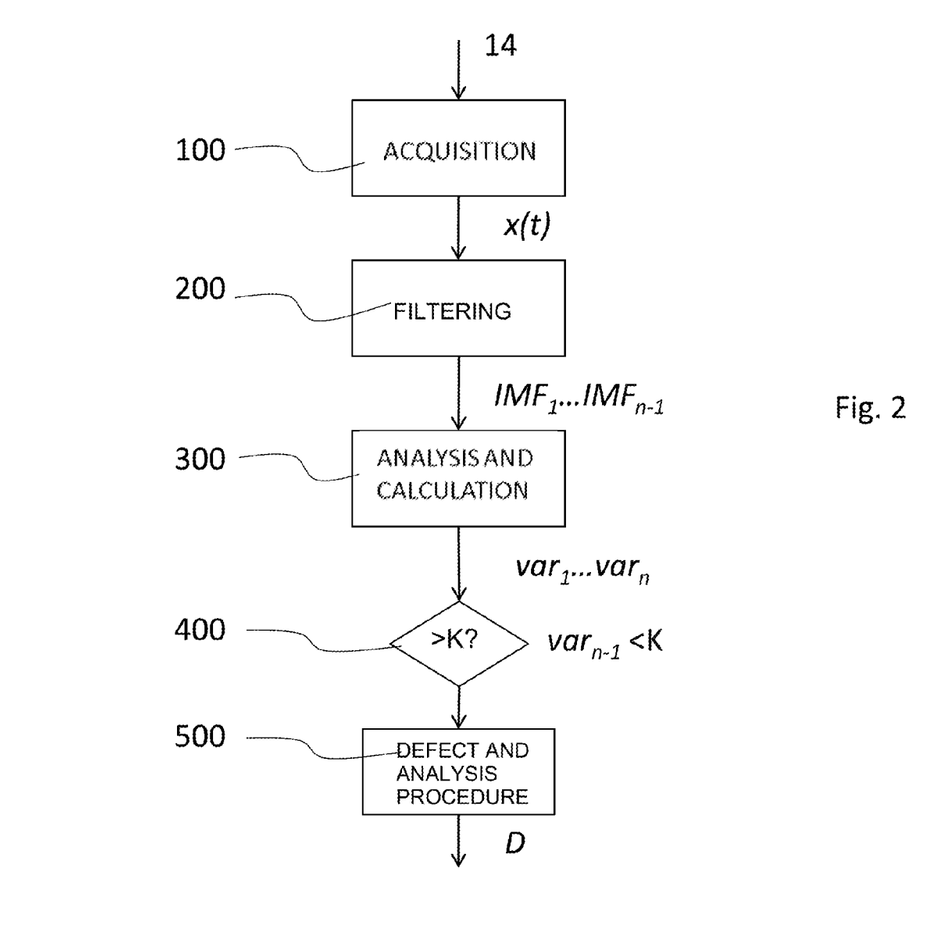
FIG. 2 shows a basic flow diagram of the method according to the invention.

With reference to the basic flow diagram of FIG. 2, the method according to the invention envisages the following operation:

- an acquiring step 100 of the signal having multiple frequency components acquired from the industrial working process x(t), generated from the sensor, for instance the pyrometer 14;
- a filtering 200 of the signal x(t) to decompose the signal x(t) in a plurality of monocomponent signals, indicated as Intrinsic Mode Functions $IMF_1 \ldots IMF_{n-1}$;
- a step 300 of analysis and calculation of the informative content of each monocomponent signal represented by Intrinsic Mode Functions $IMF_1 \ldots IMF_{n-1}$, for instance their variance $var_1 \ldots var_{n-1}$;
- a step 400 of comparison of the value of the information content of the lowest single frequency component or function $IMF_{n-1}$ in order to verify if it greater than a given K value so that represents the main percentage of the information content of the whole acquired signal x(t);
- if the result of the comparison step 400 indicates that the information content of the at the lowest single frequency component or function $IMF_{n-1}$ is not the greater percentage of the information content of the whole acquired signal x(t), such signal x(t) is considered as defective, and, optionally, a defect analysis procedure 500 is performed which can lead to identify one or more defect D, and, possibly their type.

Figure 3:
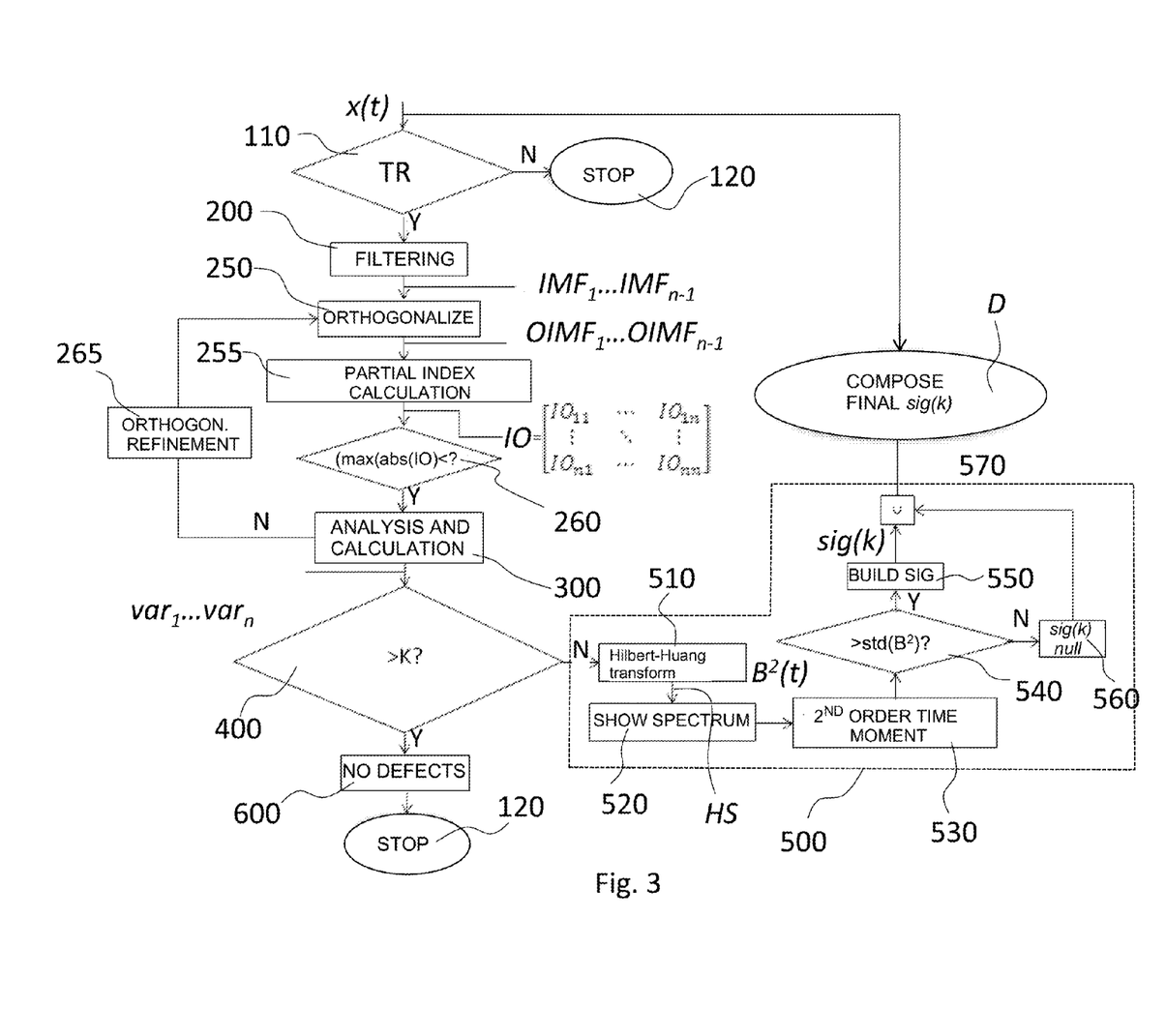
FIG. 3 is a flow diagram representing an embodiment the method according to the invention.

In FIG. 3 an embodiment of the method of FIG. 2 is detailed.

The acquired signal x(t) coming from acquire operation 100 is shown.

In a step 110 it is evaluated if the signal acquired from the process x(t) oscillates within a allowed range, specifically a temperature range TR, between minimum temperature $T_{min}$ allowed and a maximum temperature $T_{max}$. If the acquired signal x(t) is within such range TR, the analysis is carried out by passing to the decomposition step 200, else the method comes to a stop 120.

The filtering step 200 of the signal x(t) to decompose the signal x(t) in a plurality of monocomponent signals, indicated as Intrinsic Mode Functions $IMF_1 \ldots IMF_{n-1}$ uses an Empirical Mode Decomposition procedure to decompose the signal x(t) and get the Intrinsic Mode Functions $IMF_1 \ldots IMF_{n-1}$.

Then, a step 250 of orthogonalization of the Intrinsic Mode Functions $IMF_1 \ldots IMF_{n-1}$ is performed, obtaining orthogonalized Intrinsic Mode Functions $OIMF_1 \ldots OIMF_{n-1}$.

Then in a step 255 partial indexes of orthogonality between two components j, and k, in the set of orthogonalized Intrinsic Mode Functions $IOMF_1 \ldots OIMF_{n-1}$, $IO_{jk}$, among all the components are calculated, without considering the residue. This yields also a matrix IO of indexes. Such indexes IO are defined in the publication by Tian-li Huang, Wei-xinRen and Meng-lin Lou, "The orthogonal Hilbert-Huang Transform and its application in earthquake motion recordings analysis", The 14th World Conference on Earthquake Engineering Oct. 12-17, 2008, Beijing, China.

Further in a step 260 an evaluation of the values of the matrix IO is performed to control that the maximum of the absolute value of the indexes (max(abs(IO))) in the matrix is lower that a given value, for instance $1 \times 10^{-12}$. This ensures that there is not an actually severe energy leakage when applied EMD for the decomposition of time signals. If the condition of step 260 is not satisfied, through a step 265 a refinement of the orthogonalisation, going back to steps 250, 255, is performed.

Then, a step 300 of analysis and calculation of the informative content of each monocomponent signal $IMF_1 \ldots IMF_n$, which is performed in this embodiment on the orthogonalized components $OIMF_1 \ldots OIMF_{n-1}$, is carried out To this regard, it is to be noted that once the Intrinsic Mode Functions $IMF_1 \ldots IMF_{n-1}$ have been orthogonalized, some parameters from IMF components can help to analyze the signals:

- the percentage of energy content represents that how much energy each component or function $IMF_i$ contains;
- the variance $var_i$ indicates the amount of information of each $IMF_i$;
- the iteration indicates the computational cost of each component $IMF_i$.

According to an aspect of the invention, the variance values $var_i$ have been specifically selected to be calculated in the step 300 to analyze the welding quality without using any signal as reference.

In the following, it is explained how the step 400 of comparison of the informative component of a given component, $IMF_{n-1}$, with respect to the other components, $IMF_1 \ldots IMF_{n-1}$, specifically operates. The $IMF_n$ component corresponds to residue $r_n$.

Generally speaking, the temperature signal x(t) referred to the welding of polymeric materials without defect, presents slow oscillations within a fixed temperature range. In presence of defects, due to different causes, the signal x(t) varies more or less abruptly. Since the EMD decomposition step 200 aims in general at decomposing a signal x into a finite sum of components, or modes, $h_1, \ldots, h_N$, and a residue r, where the modes are less oscillating with increasing index of the mode, taking into account that the variance indicates the amount of information of each component $IMF_i$, it is considered that if the last orthogonal component OIMF ($h_{N-1}$), which is the less oscillating mode, contains the highest variance value (highest amount of information) the process signal cannot present any defect.

In FIG. 4 the orthogonalized components $OIMF_1 \ldots OIMF_{n-1}$ and the residue $r_n$ of the temperature signal x(t) are shown for a better understanding.

Additionally, since it might happen that the last component $IMF_{n-1}$ contains the maximum energy and also the highest value of variance, but the signal contains defects, to overcome this problem, it is preferably envisaged to impose that:

1) the last component $IMF_{n-1}$ must contain the highest variance value;
2) the last component $IMF_{n-1}$ must contain at least a major percentage K1 of the information, by way of preferred example the 80% of information;
3) none of the remaining component $IMF_1 \ldots IMF_{n-2}$ must singly contains more than a second percentage K2, namely 10%, of information.

The values of percentages K1, K2 of 80 and 20% are preferred values for laser welding, of course other values can be chosen for different processes, provided that the major percentage K1 is substantially greater than the second percentage K2.

Thus, summing up, the step 400 comprises preferably evaluating if the above three conditions are satisfied. In the affirmative, it is considered that the signal does not present relevant defects (block 600) and the method is stopped (block 120).

Otherwise, the defect analysis procedure 500 can be started to detect the defects of the signal x(t).

Therefore in a step 510, without considering the residue, the Hilbert-Huang transform of the signal x(t) is evaluated. The output is a Hilbert Spectrum HS to be shown in a 2D or 3D image in step 520.

Once the Hilbert Spectrum HS has been obtained, its second order moment in time is calculated in step 530:

$$f_m = \int_{-\infty}^{\infty} f HS(t,f) df / \int_{-\infty}^{\infty} HS(t,f) df$$

$$B^2(t) = [\int_{-\infty}^{\infty} f^2 HS(t,f) df / \int_{-\infty}^{\infty} HS(t,f) df] - f_m(t)^2$$

With $f_m(t)$ is indicated the first order moment in time and describes the averaged positions of the signal. The second order moment $B^2(t)$ indicates the instantaneous bandwidth, f indicates the frequency. The second order moment describes the spread in time of the signal. The step 530 includes also calculating the standard deviation of the second order moment std_$B^2$.

By the step 540 are identified, for an index k which varies from 1 to the length of the vector $B^2$, e.g. the number of samples of vector $B^2$, the samples of the second order moment $B^2(k)$ which exceed the standard deviation std_$B^2$ are classified as defects.

In step 550 then a new signal sig(k), representing the defect positions, is built with samples x(k) verifying the condition of step 540. If no sample x(k) verifies the condition, by a step 560 signal sig(k) is placed equal to null and control is passed to step 570 to compose the final signal sig(k) and then a detected signal with marked defects D is produced.

Figure 5:
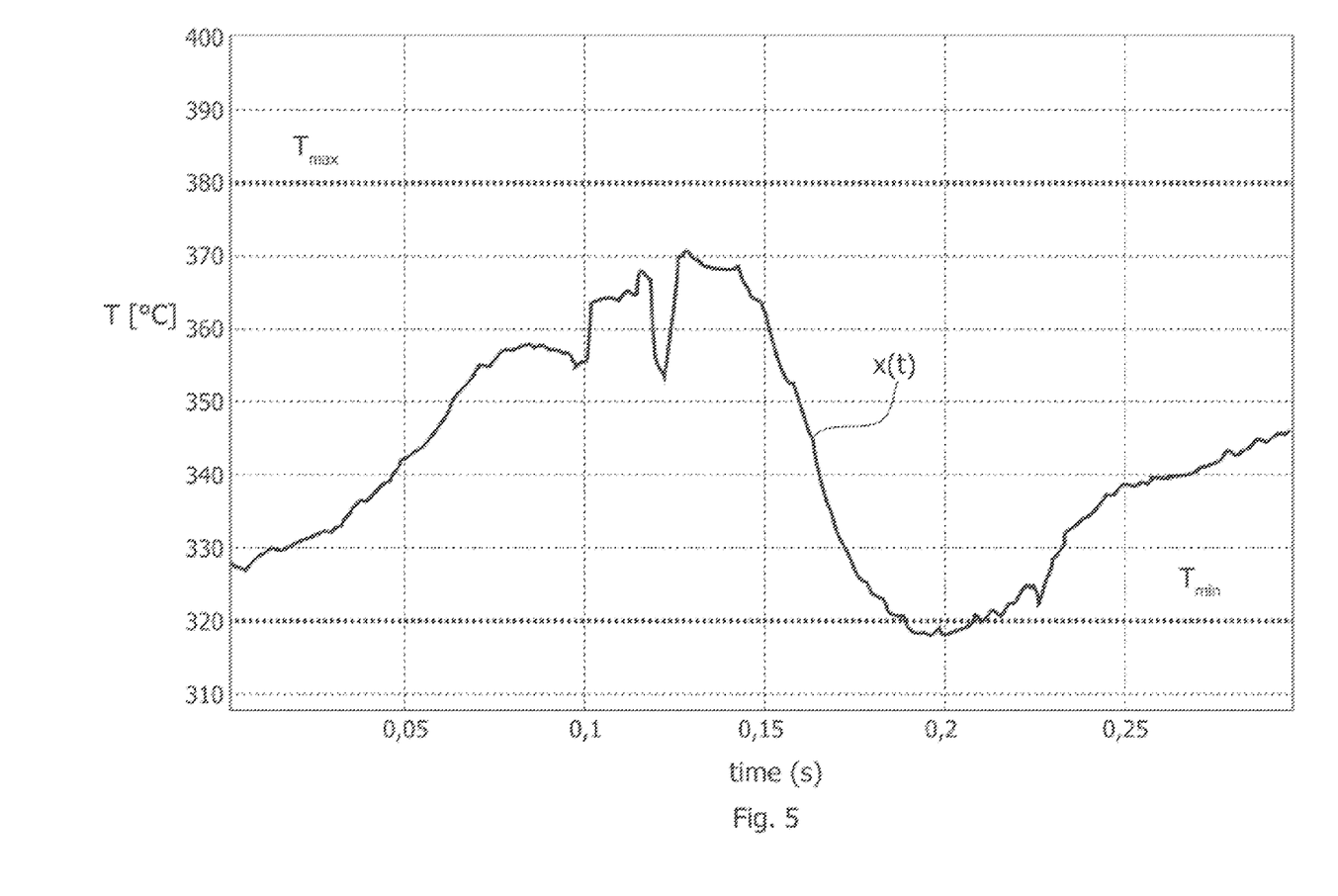
FIG. 5 and FIG. 6 represent diagrams indicating respectively a defective process signal and the defective process signal with defects marked by the method according to the invention.
Figure 6:
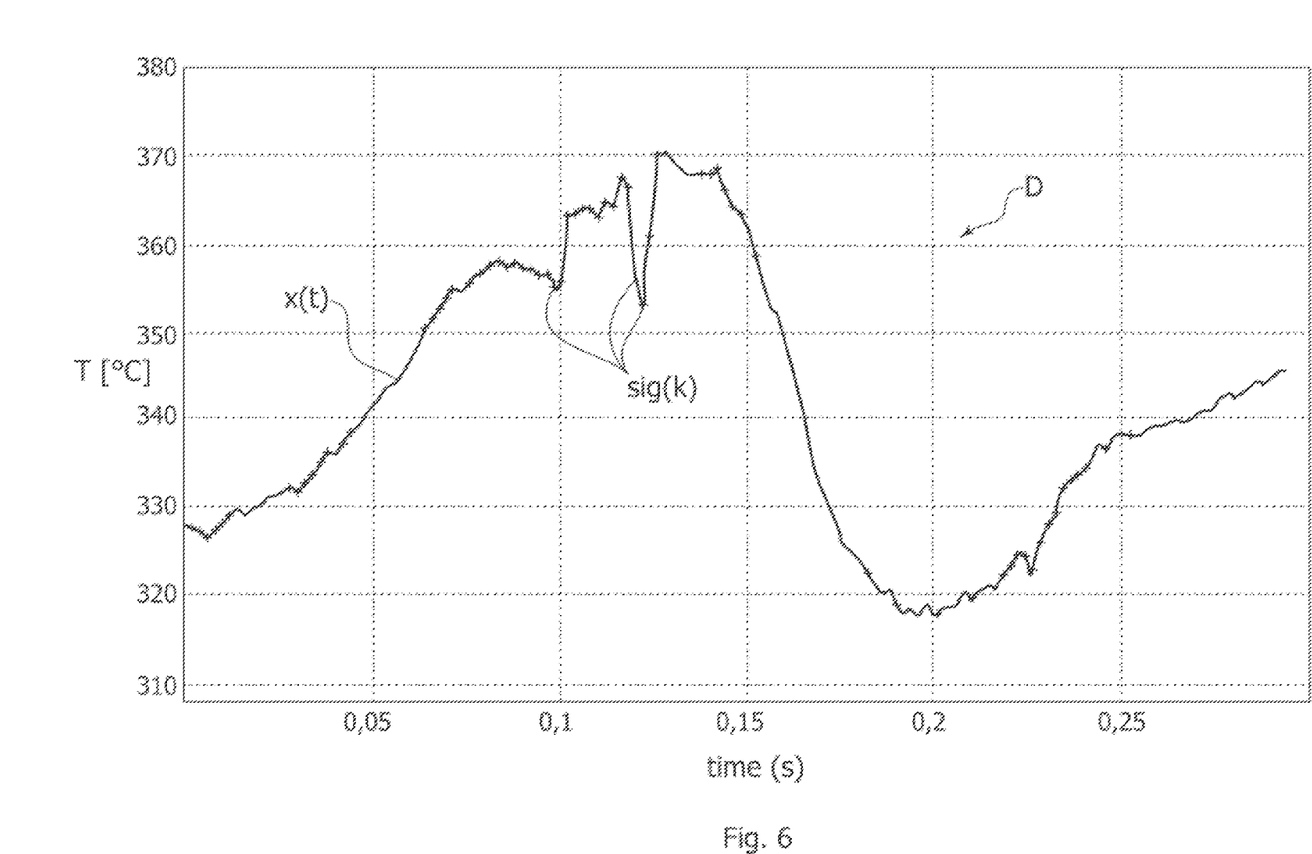

In FIG. 5 the signal x(t) for a welding with air gaps between the parts to be welded along with the maximum temperature Tmax and the minimum temperature Tmin. In FIG. 6 then it is shown the corresponding quality evaluation, where the detected signal with marked defects D is shown, by superimposing the signal representing the defect positions sig(k) (the single defects are indicated by crosses).

Of course other known procedures can be used instead of the step 510-570 described to perform the defect analysis procedure 500, such as the method described in EP-A-1767308 or in EP-A-1275464.

Thus, the method described above allows to evaluate a signal acquired by a working process, having having multiple frequency components, which by, decomposition in single components and analysis, allows to detect if the defects are present.

The method therefore allows to determine in a quick way and without use of comparison to a reference signals, which signals generated by process are indicative of defects and can be analyzed in detail to determine the position and/or the type of defects. Clearly, this allows to spare time and computational power, avoiding to evaluate in depth all the acquired signals and concentrating only on the defective signals.

The quick operation and absence of reference determine a method and system that operates very quickly, lowering considerably the costs involved.

Naturally, without altering the principle of the invention, the construction details and the embodiments may vary widely from what is described and illustrated purely by way of example herein, without thereby departing from the scope of the present invention.

The step of comparison of the informative component of a given component, $IMF_{n-1}$, with respect to a sum of the other components, IMF1 . . . IMFn−1 uses a tunable threshold, which can be established on the basis of the knowledge of the specific process. It is possible also that the threshold is obtained by a learning process.

The method is directed to laser welding process, but also to other working process, in particular involving laser, such as laser cutting processes.

The informative content is preferably chosen to be represented by a variance, in particular for welding processes, but it can be represented also by the entropy of the signal or by the autocorrelation.

The sensor used to acquire the signal from the process can be any of the sensors used in the known techniques of quality monitoring of industrial working processes producing a non-stationary signal. By way of example, with reference to laser welding or cutting, the sensor can be a photodiode acquiring the radiation reflected by the spot on which the laser operates.

What is claimed is:

1. A method for monitoring the quality of an industrial working process, which includes identifying defects of the working process, of the type comprising the steps of:
   acquiring a signal having multiple frequency components from the industrial working process, said acquired signal being generated by a process sensor,
   evaluating said signal having multiple frequency components acquired from the industrial working process to indicate if said defects and a defect analysis step is performed on said signal having multiple frequency components, said evaluation being performed without comparing said signal having multiple frequency components acquired from the industrial working process to a stored process reference signal,
   wherein the method further comprises the operations of:
   decomposing at least one signal having multiple frequency components in signals having single frequency components,
   calculating an information content for each signal having a single frequency component,
   analyzing the information content for each signal having a single frequency component, and
   if a value of the information content of the signal at the lowest single frequency component does not represent a main percentage of the information content of the whole acquired signal, said acquired signal having multiple frequency components is evaluated as indicative of a working process including defects and a defect analysis step is performed on said signal having multiple frequency components.

2. A method as claimed in claim 1, wherein said analyzing the information content for each signal having a single frequency component includes evaluating as indicative of a working process with defects the acquired signal having multiple frequency components if the value of the information content of the signal at the lowest single frequency component does not represent a given major percentage of the information content of the whole acquired signal, and
   if the signal at the lowest single frequency component has the highest informative content value and
   none of the other frequency components, singly, has value representing more than a second given percentage, lower than said main percentage of information content.

3. A method as claimed in claim 1, wherein said information content is represented by a variance of said signals having single frequency components.

4. A method as claimed in claim 1, wherein said information content is represented by the entropy or by the autocorrelation of said signals having single frequency components.

5. A method as claimed in claim 1, wherein decomposing at least one signal having multiple frequency components in signals having single frequency components includes performing and EMD (Empirical Mode Decomposition).

6. A method as claimed in claim 1, wherein decomposing said at least one signal having multiple frequency components in signals having single frequency components includes performing an orthogonalization step to compute orthogonalized single frequency components.

7. A method as claimed in claim 6, wherein includes computing indexes of orthogonality between components in the set of orthogonalized single frequency components and controlling that the maximum of the absolute value of the indexes is lower that a given value.

8. A method as claimed in claim 1, wherein said acquiring a signal having multiple frequency components from the industrial working process includes sensing a signal generated by the working process.

9. A method as claimed in as claimed in claim 1, wherein said industrial process is a laser welding process or a laser cutting process.

10. A method as claimed in claim 8, wherein said sensing a signal generated by the working process includes sensing a temperature by a temperature sensor, or sensing a radiation by a photosensor.

11. A method as claimed in claim 8, wherein said defect analysis step performed on said signal having multiple frequency components includes performing a Hilbert-Huang transform of the acquired signal to obtain an Hilbert Spectrum to be shown in a 2D or 3D image in step, calculating from said Hilbert Spectrum a second order moment in time a standard deviation of the second order moment in time, identifying and classifying as defects the samples of the second order moment in time which exceeds the standard deviation of the second order moment in time, marking as defects the samples of the acquired signal for which the second order moment exceeds the standard deviation of the second order moment in time.

12. A system for monitoring the quality of an industrial process, comprising:

sensor means for measuring one or more process parameters, and an electronic control and processing unit for processing the signals emitted by said sensor means, wherein:

said electronic control and processing unit is configured to process the signals emitted by said sensor means and to perform the method for monitoring the quality of an industrial process as claimed in claim 1.

13. A computer product directly loadable into the memory of an electronic computer and comprising software code portions to perform the method as claimed in claim 1 when the product is run on a computer.

14. A method as claimed in claim 10, wherein the temperature sensor is a pyrometer.

15. A method as claimed in claim 10, wherein the photosensor is a photodiode.

* * * * *